(12) United States Patent
Datta et al.

(10) Patent No.: US 12,092,047 B2
(45) Date of Patent: Sep. 17, 2024

(54) METHODS AND SYSTEMS FOR LAUNCHING A VEHICLE WITH A MANUAL SHIFT TRANSMISSION

(71) Applicant: Ford Global Technologies, LLC, Dearborn, MI (US)

(72) Inventors: Brij Datta, Detroit, MI (US); Brad Drogosch, Northville, MI (US); Rob Ciarrocchi, Stockbridge, MI (US); Colton Knopf, Canton, MI (US); Matthew Arthur Titus, Livonia, MI (US); Adam Busack, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 17/931,799

(22) Filed: Sep. 13, 2022

(65) Prior Publication Data

US 2024/0083433 A1    Mar. 14, 2024

(51) Int. Cl.
| | |
|---|---|
| *F02D 41/02* | (2006.01) |
| *B60W 10/06* | (2006.01) |
| *B60W 30/18* | (2012.01) |
| *B60W 30/184* | (2012.01) |
| *B60W 50/08* | (2020.01) |
| *F02D 41/00* | (2006.01) |

(Continued)

(52) U.S. Cl.
CPC .......... *F02D 41/022* (2013.01); *B60W 10/06* (2013.01); *B60W 30/18027* (2013.01); *B60W 30/18172* (2013.01); *B60W 30/184* (2013.01); *B60W 50/085* (2013.01); *B60W 50/087* (2013.01); *F02D 41/0002* (2013.01); *F02D 41/10* (2013.01); *B60W 10/18* (2013.01); *B60W 2520/26* (2013.01); *B60W 2540/14* (2013.01)

(58) Field of Classification Search
None
See application file for complete search history.

(56) References Cited

U.S. PATENT DOCUMENTS

| | | | |
|---|---|---|---|
| 6,226,587 B1 * | 5/2001 | Tachihata | B60K 28/16 701/72 |
| 6,334,500 B1 * | 1/2002 | Shin | B60K 28/16 180/197 |

(Continued)

FOREIGN PATENT DOCUMENTS

| | | | | |
|---|---|---|---|---|
| DE | 10305297 A1 * | 8/2004 | | B60K 28/16 |
| DE | 102009028935 A1 * | 3/2011 | | B60K 28/16 |

(Continued)

OTHER PUBLICATIONS

Motorsport Electronics Limited. (2019). "Launch Control / ALS". Motorsport Electronics User Documentation. https://motorsport-electronics.co.uk/onlinehelp/html/8215.html.*

*Primary Examiner* — Kevin R Steckbauer
(74) *Attorney, Agent, or Firm* — Vincent Mastrogiacomo; McCoy Russell LLP

(57) ABSTRACT

Methods and systems for operating a vehicle that includes a manual transmission are presented. In one example, a method for a vehicle having a manual transmission comprises, during an initial launch with traction control enabled, overriding driver throttle commands to maintain a setpoint speed of an engine and limiting wheel slip until wheel slip decreases below a non-zero threshold.

19 Claims, 12 Drawing Sheets

(51) Int. Cl.
*F02D 41/10* (2006.01)
*B60W 10/18* (2012.01)

(56) References Cited

U.S. PATENT DOCUMENTS

| | | | | |
|---|---|---|---|---|
| 7,853,389 | B2* | 12/2010 | Luehrsen | B60W 10/184 701/84 |
| 8,175,785 | B2* | 5/2012 | Turski | B60W 30/18027 701/84 |
| 9,592,831 | B2* | 3/2017 | Blakeway | B60W 10/06 |
| 9,670,857 | B2* | 6/2017 | Kar | F02D 41/022 |
| 10,358,141 | B2* | 7/2019 | James | B60W 30/18009 |
| 10,625,750 | B2* | 4/2020 | James | B60W 10/10 |
| 11,204,069 | B2* | 12/2021 | Marchlewski | F16D 48/08 |
| 11,338,794 | B2* | 5/2022 | Meyer | B60W 20/19 |
| 2009/0112437 | A1* | 4/2009 | Luehrsen | B60W 30/188 701/84 |
| 2010/0161188 | A1* | 6/2010 | Turski | B60T 8/175 701/67 |
| 2015/0266479 | A1* | 9/2015 | Blakeway | B60W 30/18027 477/92 |
| 2017/0051695 | A1* | 2/2017 | Kar | F02D 31/003 |
| 2018/0111625 | A1* | 4/2018 | James | B60W 30/18009 |
| 2019/0249728 | A1* | 8/2019 | Grosser | B60W 30/186 |
| 2019/0283767 | A1* | 9/2019 | James | B60W 50/0098 |
| 2020/0331456 | A1* | 10/2020 | Meyer | B60W 10/08 |
| 2024/0083433 | A1* | 3/2024 | Datta | F02D 41/10 |

FOREIGN PATENT DOCUMENTS

| | | | | |
|---|---|---|---|---|
| DE | 102011110612 | A1* | 2/2013 | B60K 28/16 |
| DE | 102023124330 | A1* | 3/2024 | B60W 10/06 |
| EP | 2949535 | A1* | 12/2015 | B60W 30/18027 |
| EP | 2949535 | B1* | 8/2016 | B60W 30/18027 |
| EP | 2900532 | B1* | 7/2019 | B60W 10/06 |
| GB | 2454336 | A* | 5/2009 | B60T 8/175 |
| GB | 2506589 | A* | 4/2014 | B60W 10/06 |
| JP | 2002188479 | A* | 7/2002 | |
| JP | 3482680 | B2* | 12/2003 | B60K 28/16 |
| JP | 2004026006 | A* | 1/2004 | |
| JP | 3726182 | B2* | 12/2005 | |
| JP | 3835164 | B2* | 10/2006 | |
| JP | 3985450 | B2* | 10/2007 | |
| JP | 2015227107 | A* | 12/2015 | B60W 30/18027 |
| JP | 2016186348 | A* | 10/2016 | |
| JP | 6197818 | B2* | 9/2017 | |
| JP | 6420244 | B2* | 11/2018 | B60W 10/06 |
| WO | WO-2011023452 | A1* | 3/2011 | B60K 28/16 |

* cited by examiner

METHODS AND SYSTEMS FOR
LAUNCHING A VEHICLE WITH A MANUAL
SHIFT TRANSMISSION

FIELD

The present description relates to methods and systems for operating a vehicle with a manual transmission. The methods and systems may be particularly useful for improving launch maneuvers.

BACKGROUND AND SUMMARY

Manual transmissions allow a driver of a vehicle to have control over transmission gear shifting. They also require the driver to perform orchestrated movements to achieve seamless gear shifts. As one example, when competing in a time trial, such as a 0-60 or ¼ mile event, the initial launch maneuver impacts the ability to achieve the best straight-line launch. One way for the driver to perform an aggressive launch is to feather the clutch and simultaneously increase throttle as the gear engages. However, such a maneuver may be difficult for some drivers to perform. Consequently, novice drivers may struggle to replicate repeatable aggressive launches with manual transmissions due to the challenge in quickly maneuvering a clutch release and driver demand pedal to wide-open-pedal (WOP) while limiting the tires slip.

The inventors herein have recognized the above-mentioned challenges and has developed a method for operating a vehicle having a manual transmission and a clutch pedal, comprising: during an initial launch with traction control enabled; overriding driver throttle commands to maintain a setpoint speed of an engine and limiting wheel slip until wheel slip decreases below a non-zero threshold. In this way, a novice driver may experience improved time trials and a smoother launch.

The present description may provide several advantages. In particular, the approach may increase a driver's confidence level when executing an aggressive initial launch maneuver. Further, the approach may reduce torque disturbance and driveline wear due to mishandling.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example embodiments, referred to herein as the Detailed Description, when taken alone or with reference to the drawings, where.

DETAILED DESCRIPTION

Figure 1:
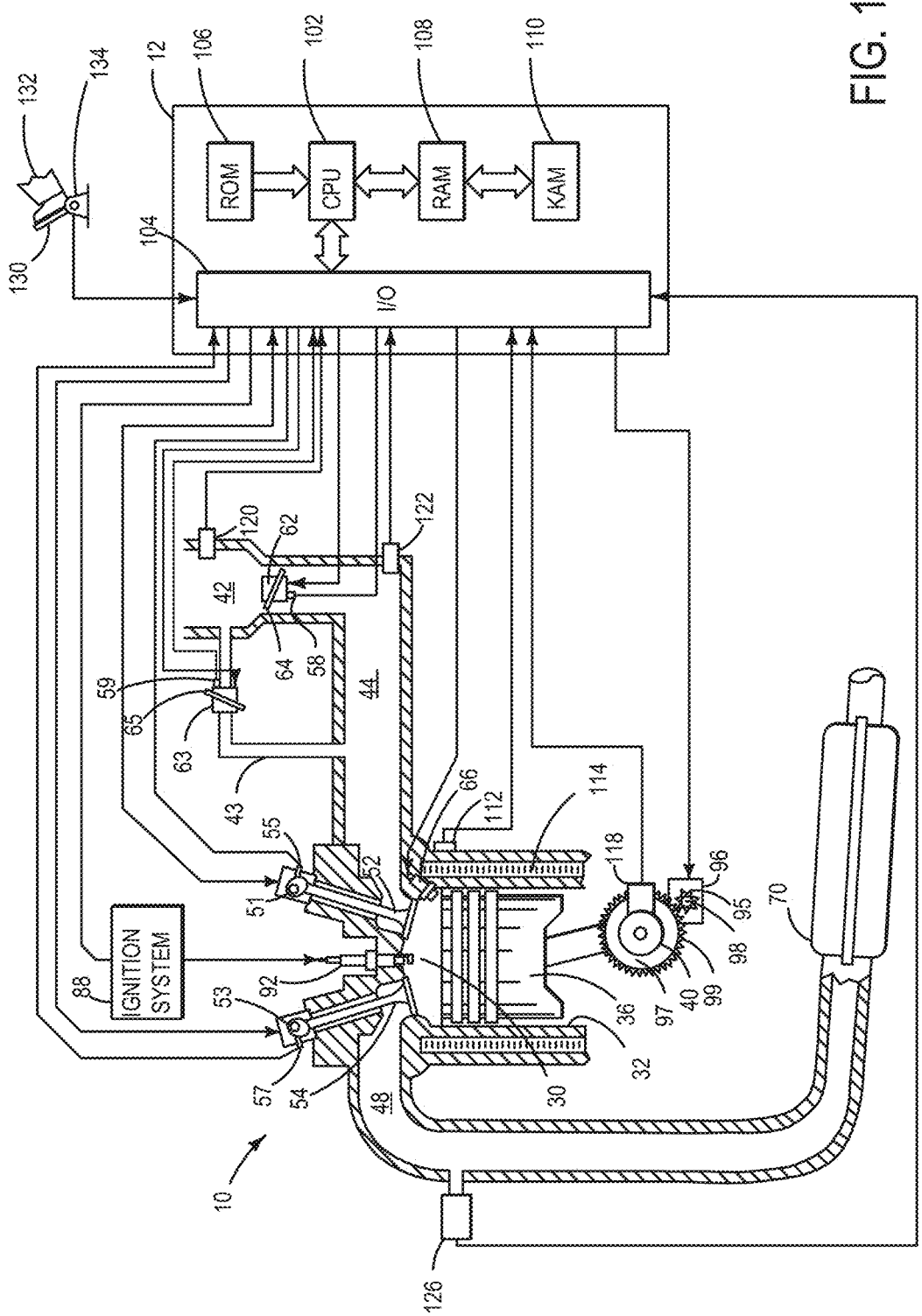
FIG. 1 is a schematic diagram of an engine.
Figure 2:
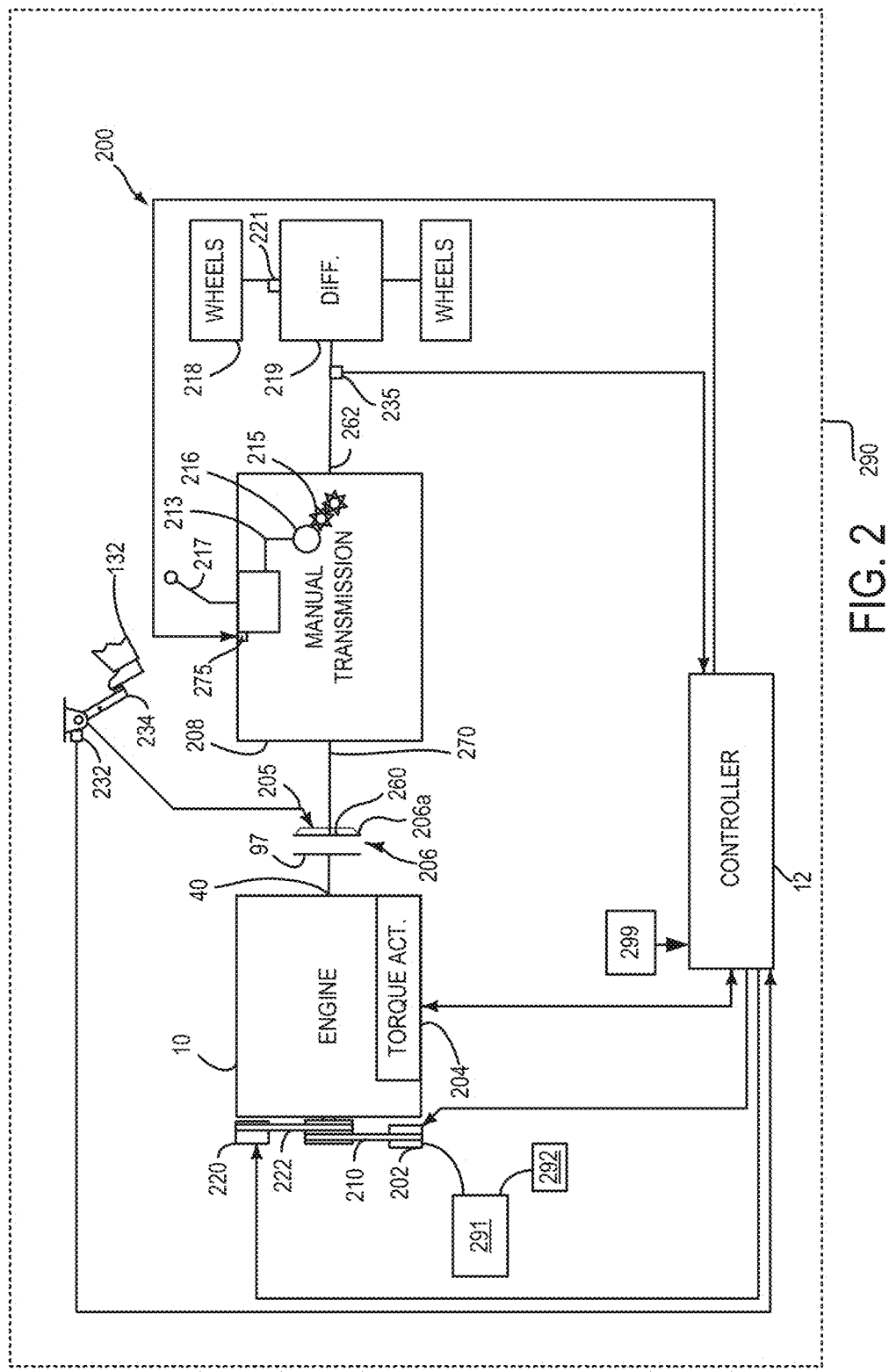
FIG. 2 is an example vehicle driveline configuration.
Figure 3:
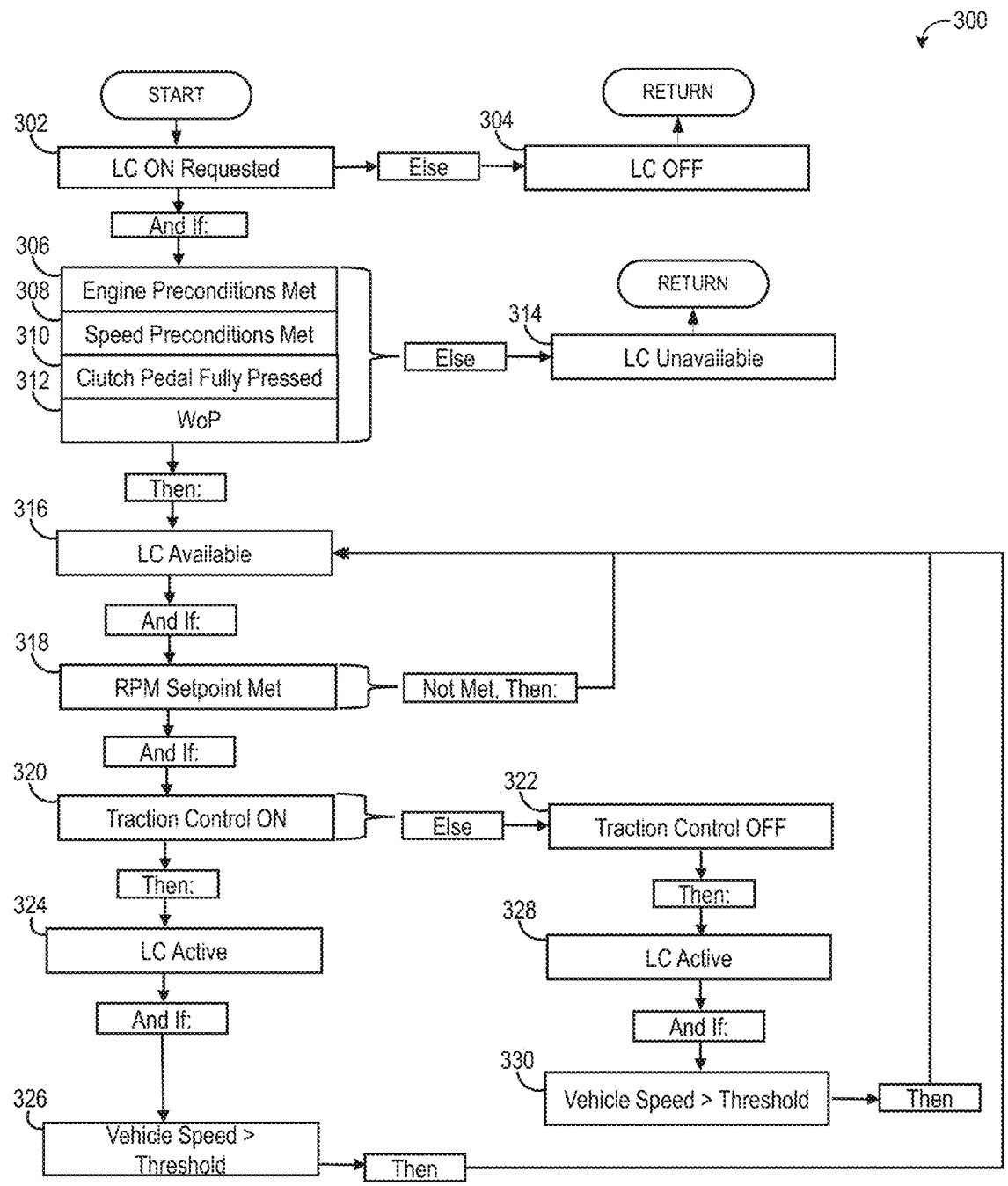
FIG. 3 shows a first example of a method for assisting a driver during launch for a manual transmission.
Figure 4A:
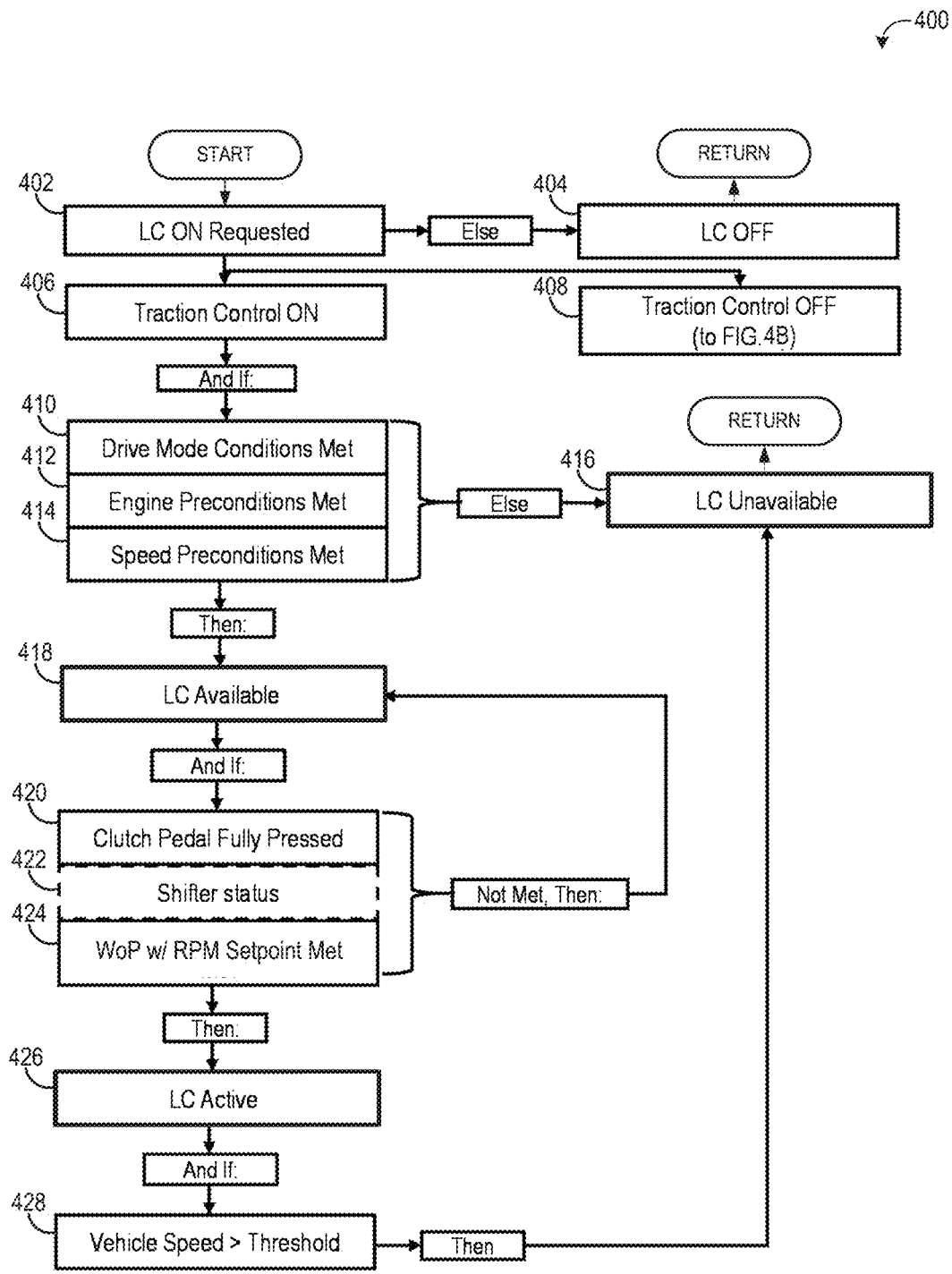
FIG. 4A shows a second example of a method for assisting a driver during launch for a manual transmission.
Figure 4B:
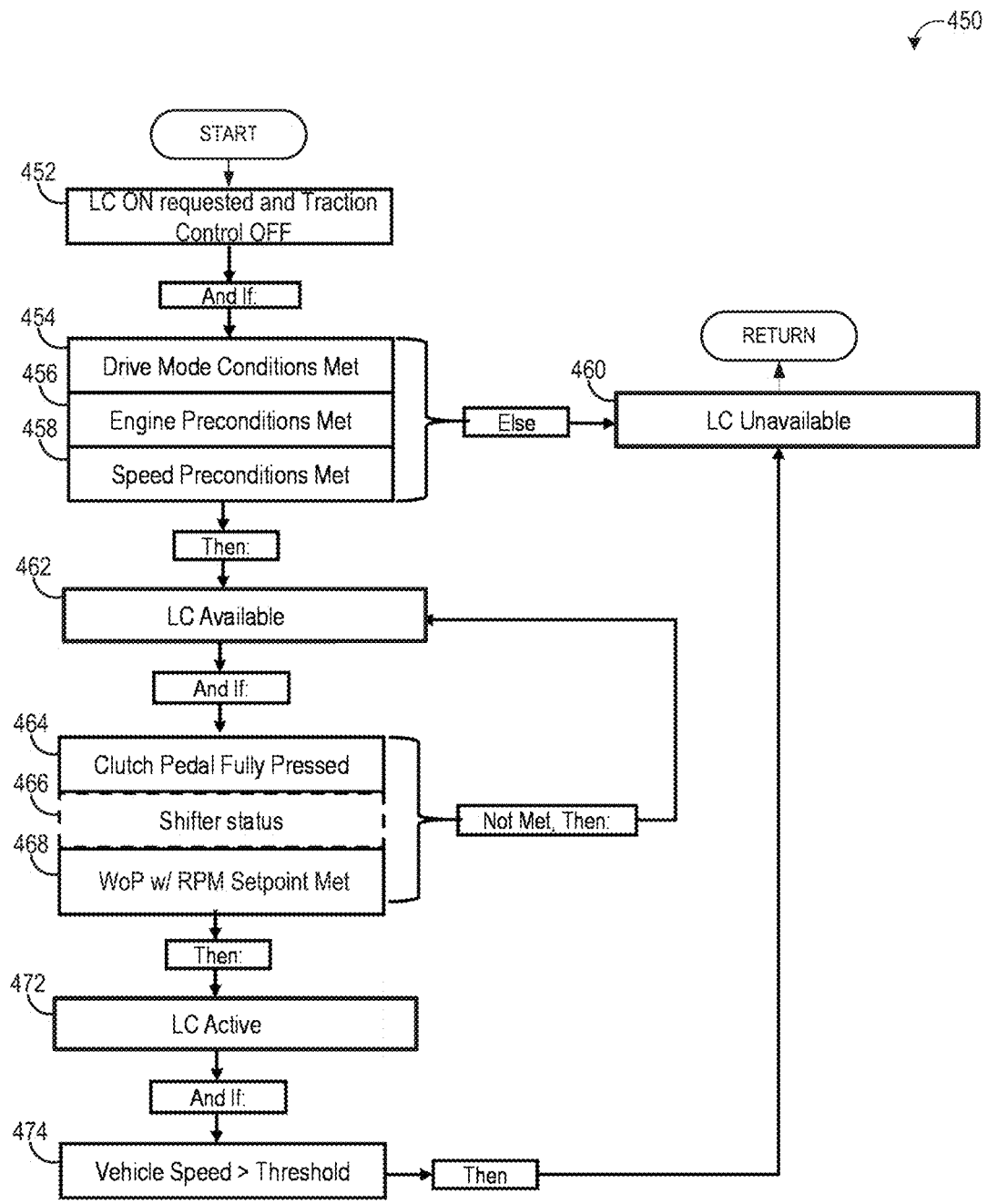
FIG. 4B shows a third example of a method for assisting a driver during launch for a manual transmission.
Figure 5:
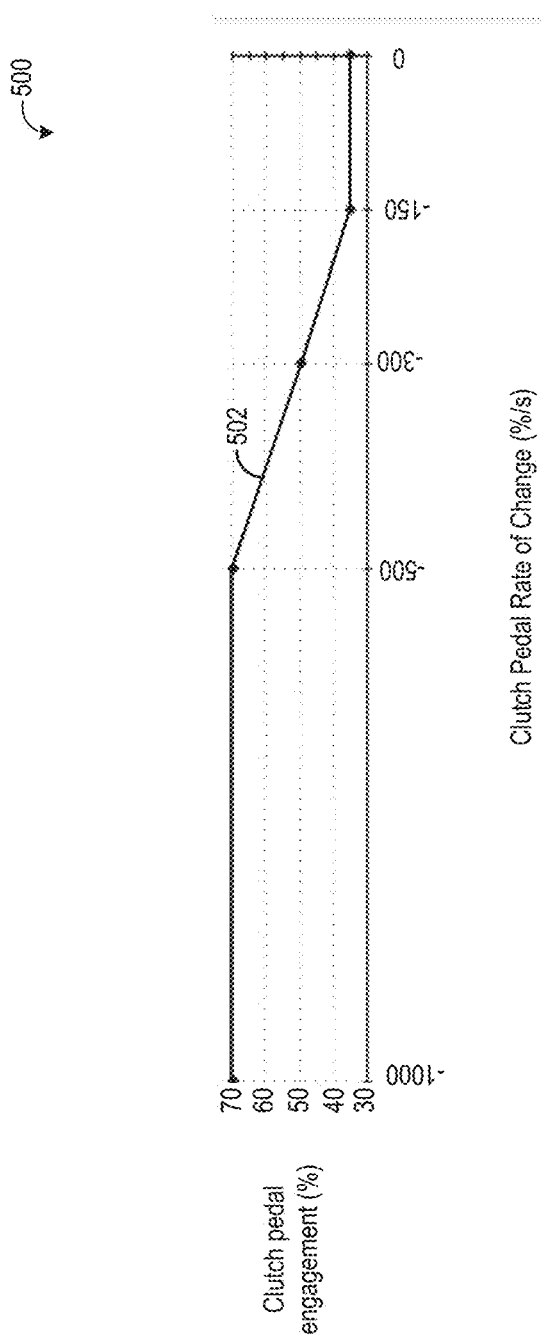
FIG. 5 shows an example plot of a relationship between launch control transition to motion and clutch pedal engagement according to the methods of FIG. 3, FIG. 4A, and FIG. 4B.
Figure 6:
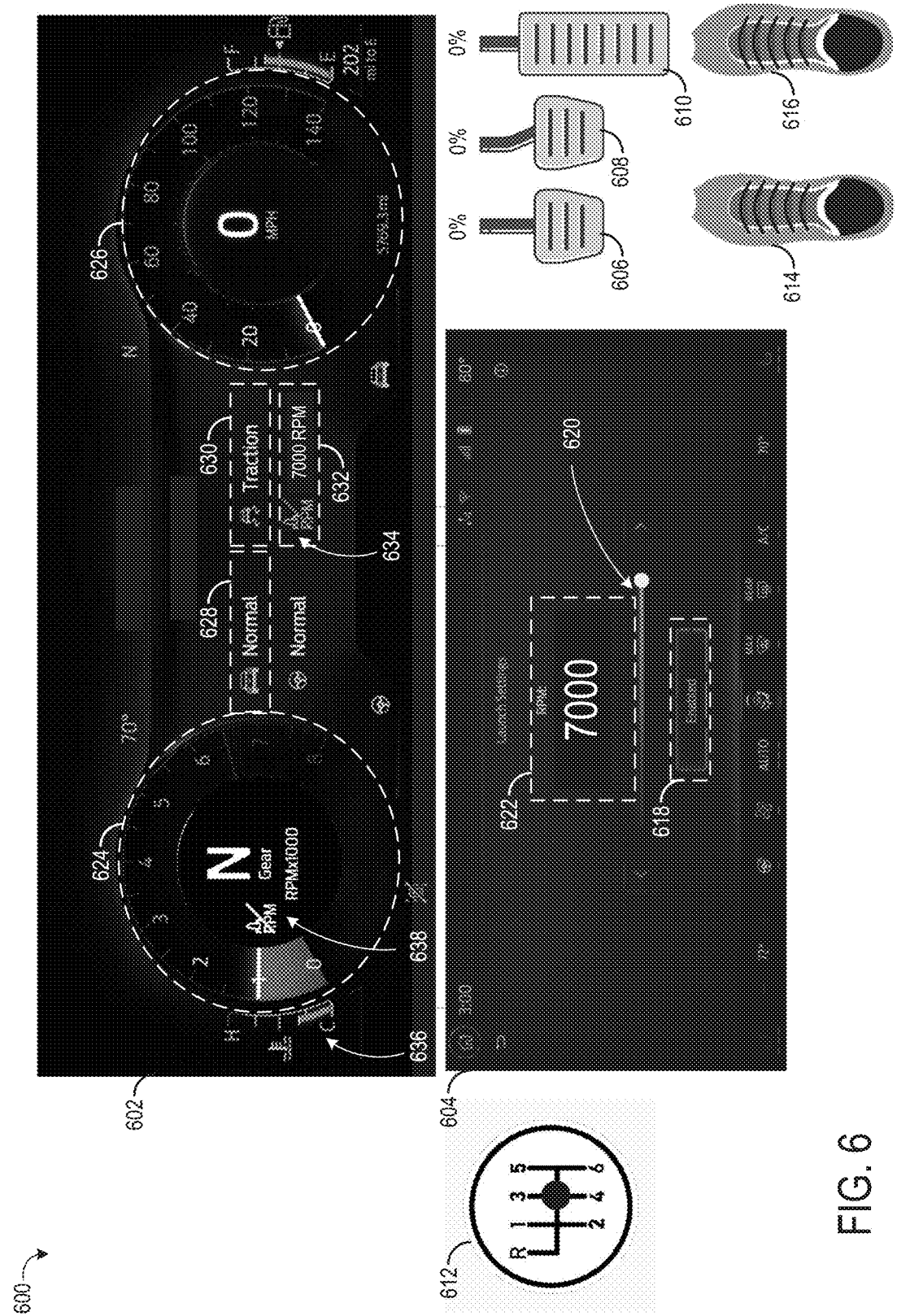
FIG. 6, FIG. 7, and FIG. 8 show an example use case of the method for assisting a driver during launch for a manual transmission.
Figure 7:
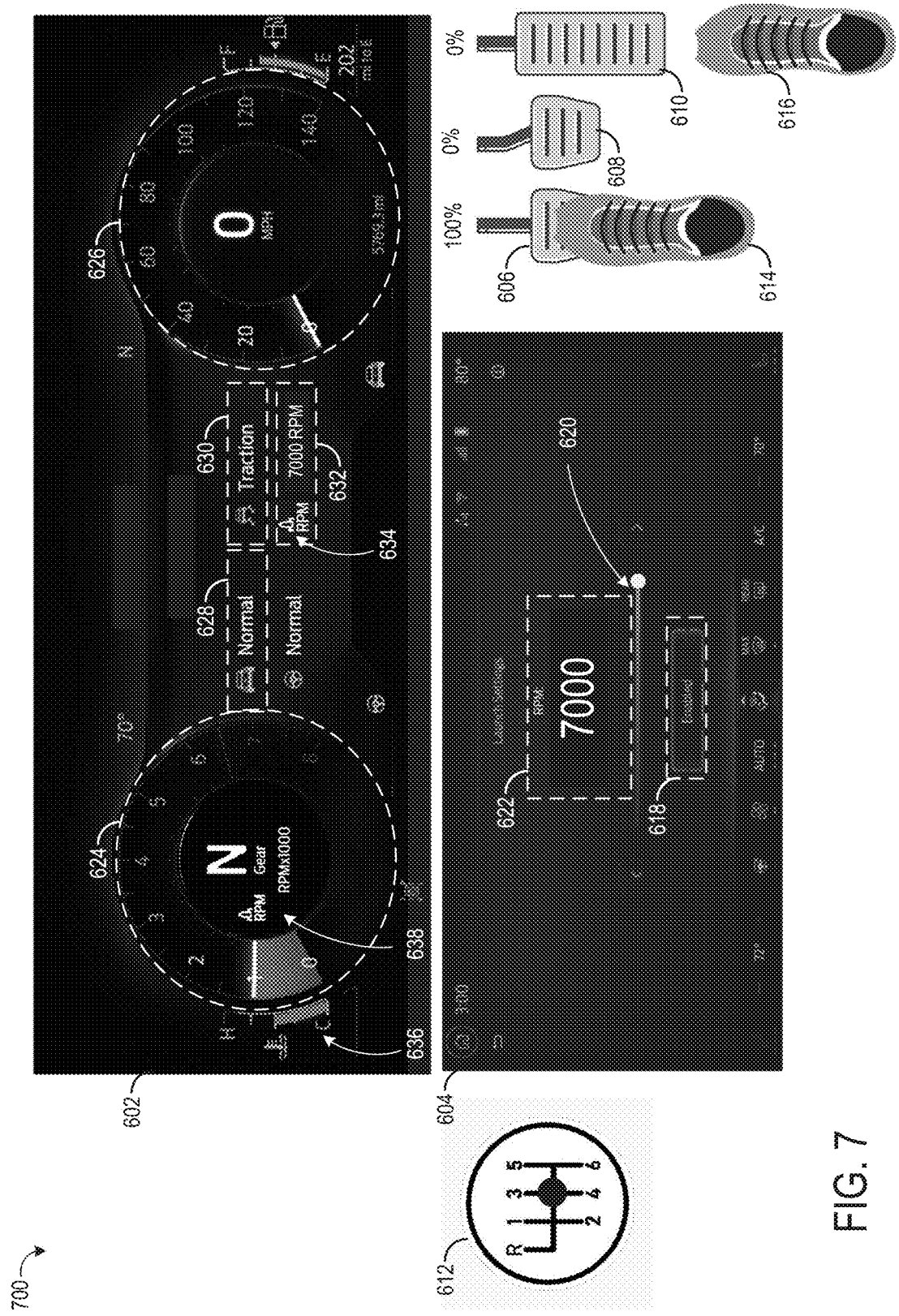
Figure 8:
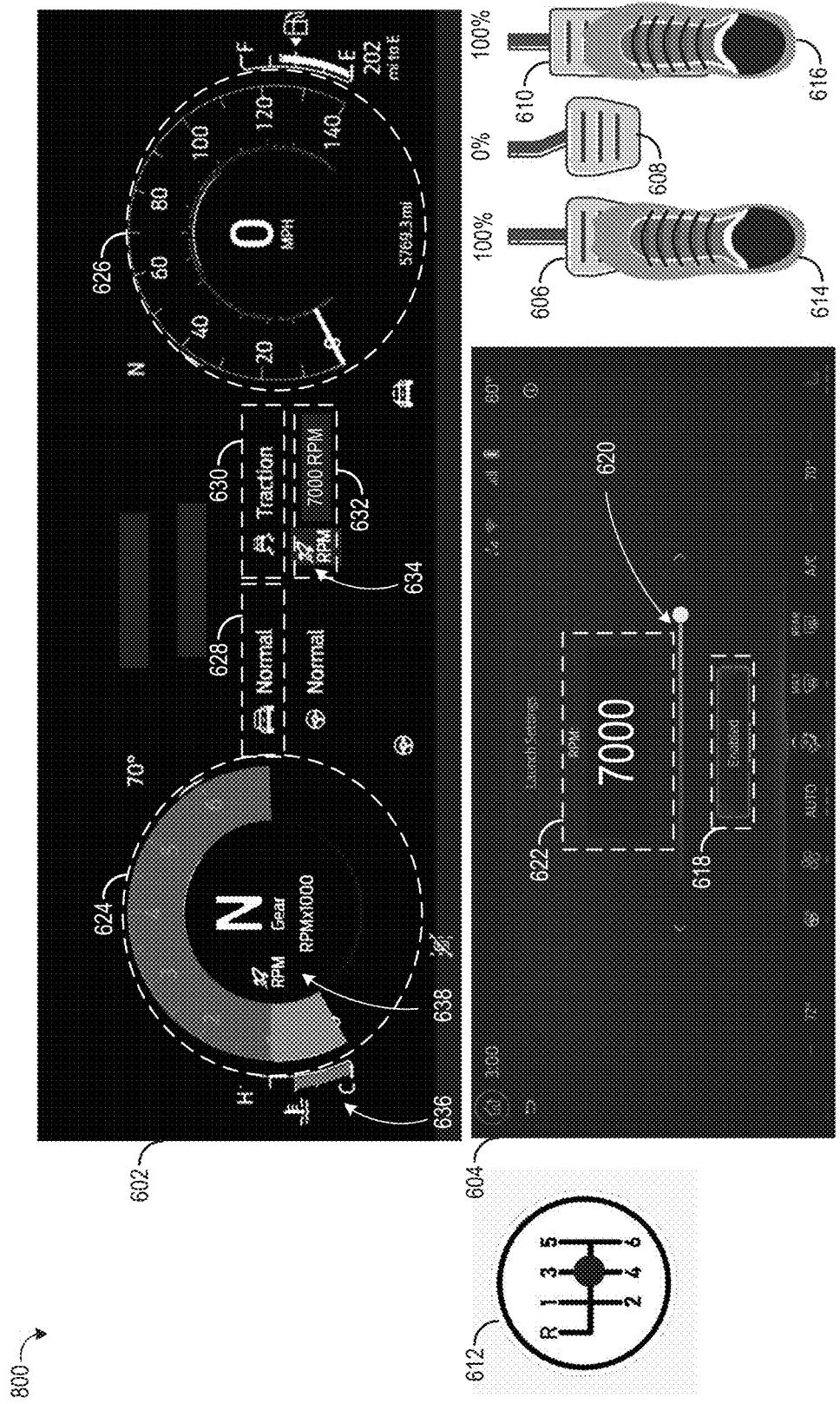
Figure 9:
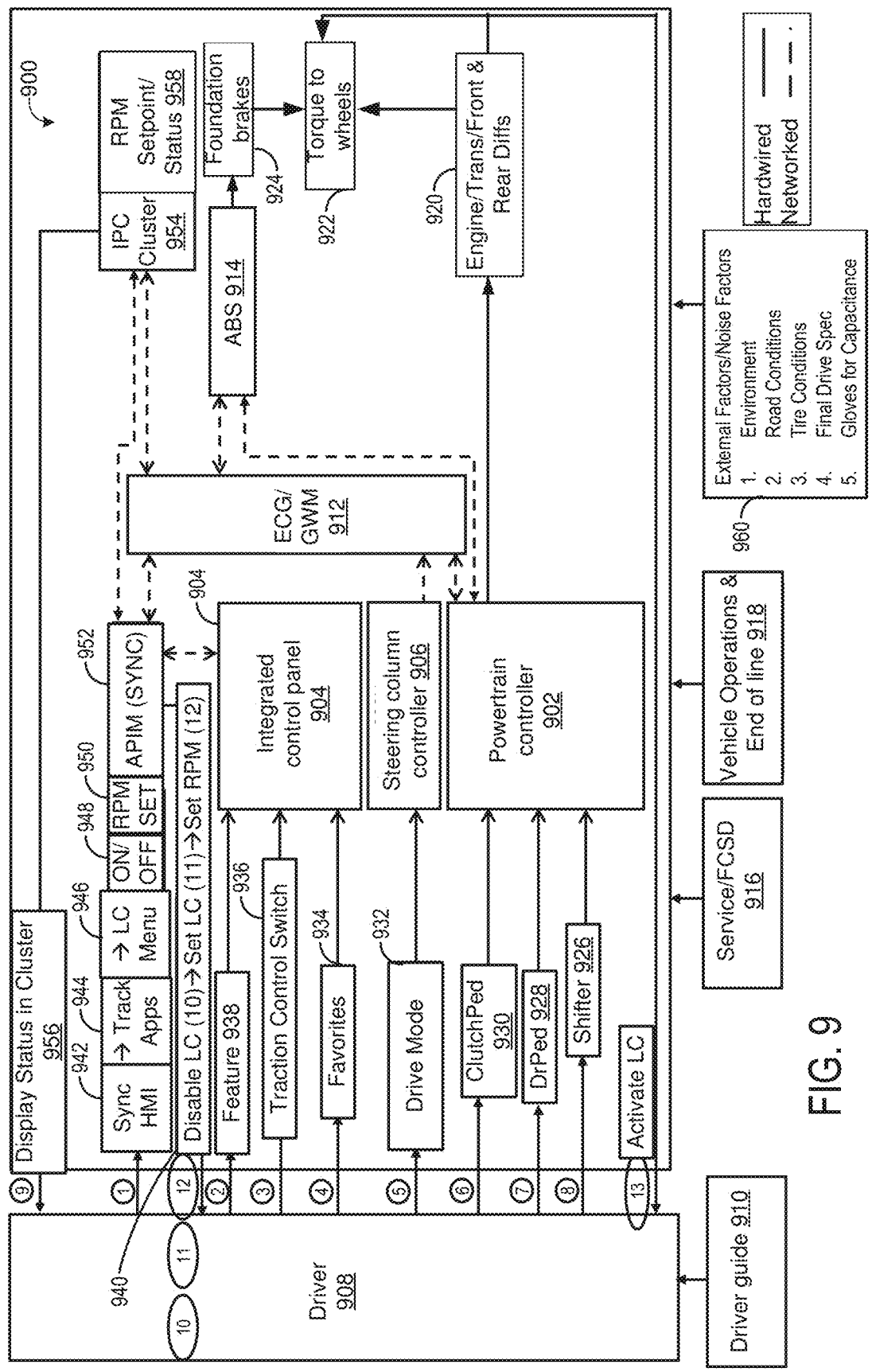
FIG. 9 shows an example boundary diagram of launch control for a manual transmission.

The present description is related to operating a vehicle that includes an internal combustion engine and a manual transmission. A driver may lack dexterity and experience to perform an aggressive initial launch maneuver in a manual transmission, but a controller may assist the driver by overriding driver throttle commands to maintain a speed setpoint of an engine and limiting wheel slip until wheel slip decreases below a non-zero threshold. As one example, a powertrain controller may hold the setpoint until the operator releases the clutch and the vehicle exceeds 5 miles per hour (mph). Upon transitioning past 5 mph, the setpoint is released and the powertrain controller may permit the engine to climb to WOP. By assisting the driver to maintain the setpoint speed during the initial launch, the operator may focus on efficiently feathering or side-stepping the clutch, per their preference, to engage the gear quickly. Additionally, by launching with traction control enabled, intervention via brake application may assist the operator by preventing unintended wheel slip, for example, due to too much power being sent to the wheels during the transition from 5 mph to the transition from first to second gear. A vehicle with a manual transmission may include an engine as shown in FIG. 1. The engine may be mechanically coupled to a driveline configuration as shown in FIG. 2. FIG. 3, FIG. 4A, and FIG. 4B illustrate example methods for assisting a driver to perform an initial launch maneuver by overriding driver throttle commands to maintain a setpoint speed of an engine until wheel slip decreases below a threshold. FIG. 5 shows an example plot of a relationship between launch control transition to motion and clutch pedal engagement. FIG. 6, FIG. 7, and FIG. 8 show an example series of a use case of the method for assisting a driver to perform an initial launch maneuver, such as described with respect to FIG. 3 FIG. 4A, and FIG. 4B. FIG. 9 shows an example boundary diagram illustrating manual transmission launch control. Example operations of the systems and methods for assisting a driver to perform an initial launch for a manual transmission are shown in timing diagrams in FIG. 10 and FIG. 11.

Referring to FIG. 1, internal combustion engine or engine 10, comprising a plurality of cylinders, one cylinder of which is shown in FIG. 1, is controlled by electronic engine controller or controller 12. The controller 12 receives signals from the various sensors shown in FIGS. 1-2 and employs the various actuators of FIGS. 1-2 to adjust engine and driveline operation based on the received signals and instructions stored on memory of controller 12.

Engine 10 includes combustion chamber 30 and cylinder walls 32 with piston 36 positioned therein and connected to crankshaft 40. Flywheel 97 and ring gear 99 are coupled to crankshaft 40. Crankshaft 40 rotates and selectively provides power to vehicle wheels via a driveline. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

A liquid fuel injector or fuel injector 66 is shown positioned to inject fuel directly into combustion chamber 30, which is known to those skilled in the art as direct injection. Alternatively, liquid fuel may be injected to an intake port, which is known to those skilled in the art as port injection. Fuel injector 66 deliver liquid fuel in proportion to pulse widths provided from controller 12. Fuel is delivered to fuel injector 66 by a fuel system (not shown) including a fuel tank, fuel pump, and fuel rail (not shown).

Engine 10 may include a dual throttle system. In one example, intake manifold 44 is shown communicating with a first throttle 62 that adjusts a position of throttle plate 64 to control air flow from air intake 42 to intake manifold 44. In some examples, first throttle 62 and throttle plate 64 may be positioned between intake valve 52 and intake manifold 44 such that first throttle 62 is a port throttle. In one example, intake manifold 44 is shown further communicating with a second throttle 63 that adjusts a position of a second throttle plate 65 to control air flow from air intake 42 via passage 43 to intake manifold 44. First throttle 62 and second throttle 63 may be electronic throttles in electronic communication with controller 12. In one example, the dual throttle system allows for increased control of manifold air flow resulting in the engine system being more responsive to driver demand.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of a catalytic converter or converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

A human driver or driver 132 inputs a driver demand torque to controller 12 via driver demand pedal 130 and driver pedal position sensor 134. The driver demand torque may be a function of vehicle speed and driver demand pedal position.

Controller 12 is shown in FIG. 1 as a conventional microcomputer including: microprocessor unit 102, input/output ports 104, non-transient memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 122 coupled to intake manifold 44; an engine position sensor 118, such as a Hall effect sensor, sensing crankshaft 40 position; a measurement of air mass entering the engine from sensor 120; a measurement of first throttle position from sensor 58, and a measurement of second throttle position from sensor 59. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. Vehicle driveline 200 may be powered by engine 10 in vehicle 290. Engine 10 may be started with an engine starting system shown in FIG. 1. Further, engine 10 may generate or adjust torque via torque actuator 204, such as a fuel injector, cam, throttle, etc. Engine 10 may provide torque to alternator 202 via chain 210 to provide electrical power to electrical devices. Thus, alternator 202 selectively applies a negative torque to engine 10. Further, electrical charge is supplied by alternator 202 to electric energy storage device (e.g., battery) 291. Electric energy storage device supplies charge to ancillary electrical devices 292 (e.g., window defroster, radio, etc.). Optional integrated starter/generator (ISG) 220 is an electric machine that may selectively apply positive or negative torque to engine 10 via chain 222. ISG 220 may supply a positive torque to start engine 10 or to increase driveline torque when output torque of engine 10 is limited or insufficient to meet a driver demand torque.

An engine output torque may be transmitted from crankshaft 40 to manually operated clutch 206. Crankshaft 40 is directly coupled to flywheel 97 and manually operated clutch 206 selectively engages flywheel 97 to transmit engine torque to transmission input shaft 270. An output side 260 of manually operated clutch 206 is directly coupled to transmission input shaft 270 of manual transmission 208. An actuator 205 moves manually operated clutch plate 206a in a longitudinal direction to engage or disengage transmission input shaft 270 to the engine flywheel 97. Clutch actuator 205 may be comprised of a combination of mechanical, electrical, and hydraulic components. In one mode, a position of actuator 205 is adjusted to move proportionately with a positon of clutch pedal 234 so that clutch 206 may be applied and released. A position of clutch pedal 234 is relayed to controller via clutch pedal sensor 232. Clutch pedal 234 is in a base position when driver 132 is not touching clutch pedal 234. Driver 132 applies force to move clutch pedal from its base position so that manually operated clutch 206 may be opened when clutch pedal 234 is applied. Manually operated clutch 206 may be closed when clutch pedal 234 is released.

Transmission input shaft 270 of manually operated manual transmission 208 may be selectively coupled to gears (e.g., gears 1-6) 215. The gears 215 are fixed ratio gears that provide different ratios between transmission input shaft 270 and output shaft 262. Gears 215 may freely rotate about the output shaft 262 and synchronizers 216 may be utilized to lock the gears to the output shaft 262. Gears 215 may be manually engaged and disengaged by opening clutch 206 and driver 132 moving manual gear selector or shifter 217 to individually engage gears 215 via shift forks 213 and synchronizers 216. Thus, gears of manual transmission 208 are not automatically changed or changed via non-human actuators such as solenoids. Closing clutch 206 transfers power from engine 10 to wheels 218 when one of gears 215 is engaged via manual gear selector or shifter 217. Gear positions are reported to controller 12 via gear position sensors 275. Output shaft 262 links manual transmission 208 to wheels 218. The rotational speed of output shaft 262 may be determined via output shaft speed sensor 235. The rotational speed of the wheels 218 may be determined by one or more wheel speed sensors 221. In some examples, an axle and differential 219 with gears may be positioned between manual transmission 208 and wheels 218.

Controller 12 may be configured to receive inputs from engine 10, as shown in more detail in FIG. 1, and accordingly control a torque output of the engine and/or ISG 220, and operation of the alternator 202. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. ISG output may be controlled via supplying electrical current to ISG 220 including controlling field current of ISG 220. Controller 12 may also receive input from a driver and provide status and data to a driver via a machine/human interface or HMI 299. The HMI 299 may be a keyboard or touch screen device and a speaker for audible notification of a driver.

As one example, the HMI 299 may include a launch control application for assisting a driver to maintain a desired RPM during an initial launch. The driver may request launch control and input the desired RPM, e.g., a setpoint speed, via the HMI 299. In one example, the controller 12 may activate launch control responsive to signals received from the driver pedal position sensor 134, the clutch pedal sensor 232, and the engine position sensor 118. In one example, the controller 12 may control a timing of throttle opening based on a rate of clutch pedal engagement during a pre-stage transition to vehicle motion. In other words, how fast or slow the driver releases the clutch pedal in a transition to the initial launch maneuver influences the timing of throttle opening. For example, faster clutch pedal release may invoke earlier throttle opening and slower clutch pedal release may allow for later throttle opening. In one example, the controller 12 may determine the initial launch from vehicle speed being below a nominal non-zero threshold for greater than a threshold amount and enable launch control responsive to the initial launch being determined. As another example, the driver may select to enable or disable traction control via the HMI 299. For example, with the driver having selected traction control, responsive to an indication of a loss of traction, such as indicated by greater than expected wheel slip, e.g., wheel slip increases above a threshold, the controller may intervene in one or more ways. For example, the controller 12 may apply brake force, reduce, or suppress spark sequence to one or more cylinders, retard ignition, reduce fuel supply to one or more cylinders, and close the first throttle and/or the second throttle. In one example the driver may select to enable or disable traction control during the launch control.

Thus, the systems of FIGS. 1-2 provide for a vehicle system, comprising: an engine; a manual transmission coupled to the engine; a plurality of wheels coupled to the manual transmission; a clutch pedal; and a controller including executable instructions stored in non-transitory memory to, during an initial launch with traction control enabled, override driver throttle commands to maintain a first setpoint speed of an engine and limit wheel slip until wheel slip decreases below a first non-zero threshold; and, during an initial launch with traction control disabled, override driver throttle commands to maintain a second setpoint speed of an engine until wheel speed exceeds a second non-zero threshold. In one example, the vehicle system includes instructions to control a timing of throttle opening based on a clutch pedal rate. For example, a faster rate of clutch pedal engagement produces earlier throttle opening and a slower rate of clutch pedal engagement produces later throttle opening. The vehicle system may include instructions to activate the override responsive to an indication of meeting one or more engine-ready conditions, one or more speed pre-conditions, and one or more drive mode conditions. By maintaining the engine at the setpoint speed, the driver may focus on clutch control technique without also having to simultaneously increase throttle as the gear engages. In this way, a driver of a manual transmission may be assisted to perform an initial launch maneuver.

Referring now to FIG. 3, FIG. 4A and FIG. 4B, example methods for assisting an operator to perform an initial launch maneuver for a vehicle having a manual transmission and a clutch pedal are shown. The methods of FIG. 3, FIG. 4A, and 4B may be at least partially implemented as executable instructions stored in non-transitory controller memory. In one example, FIG. 3 shows a first example of a method 300 for overriding driver throttle command to maintain an engine speed setpoint and, optionally, limiting wheel slip via a traction control system until wheel slip decreases below a non-zero threshold. FIG. 4A shows a second example of a method 400 for overriding driver throttle commands to maintain an engine speed setpoint where traction control is enabled. FIG. 4B shows a third example of a method 450 for overriding driver throttle commands to maintain an engine speed setpoint where traction control is disabled. In one example, the method 450 may be a sub-method of the method 400. In another example, the method 400 and the method 450 may be carried out independently. Instructions for carrying out the method 300, the method 400 and the method 450 may be executed by a controller based on instructions stored in a memory of the controller and in conjunction with signals received from sensors of the drivetrain system, such as controller 12, temperature sensor 112, pressure sensor 122, first throttle sensor 58, second throttle sensor 59, engine position sensor 118, wheel speed sensors 221, driver pedal position sensor 134, and clutch pedal sensor 232 described above with reference to FIG. 1 and FIG. 2. The control system may adjust actuators of the vehicle system to adjust vehicle operation, according to the methods described below.

Referring now to FIG. 3, the method 300 for a vehicle having a manual transmission is shown. Method 300 determines launch control "on" is requested at 302 or determines launch control "off" is requested at 304. If method 300 determines launch control "on" is requested the method continues to 306. Otherwise, the method returns.

Having determined that launch control is requested, the method 300 determines whether one or more base conditions and one or more engine-ready conditions for launch control are met. For example, at 306, the method 300 determines whether engine preconditions are met. In some examples, engine preconditions may include engine temperature and/or engine pressure meeting respective thresholds, etc. In some examples, engine preconditions may include driveline control states. For example, launch control may unavailable with line lock selected (if available) and/or the transmission in reverse. At 308, the method 300 determines whether one or more speed preconditions are met. Speed preconditions may include vehicle speed less than a threshold speed such as estimated from an output shaft speed sensor (e.g., output shaft speed sensor 235 in FIG. 2). At 310, the method 300 judges if the clutch pedal is fully pressed, indicating clutch disengagement. In one example, the method 300 may judge if the clutch pedal is fully pressed based on an output of a clutch pedal position sensor, e.g., the clutch pedal position exceeding a threshold. At 312, the method 300 judges if wide open pedal is indicated. For example, the method 300 may judge wide open pedal is indicated based on an output of the driver pedal position sensor, e.g., the driver demand pedal position exceeding a threshold. If base conditions and engine-ready conditions are met, the method 300 determines launch control is available at 316. Otherwise, the method 300 determines launch control is unavailable at 314.

Having determined launch control is available at 316, the method 300 may judge if the RPM setpoint condition is met at 318. In one example, based on the setpoint indicated by the driver to the HMI, the driveline controller may maintain the RPM at the setpoint speed during an initial launch. The engine RPM may be adjusted via adjusting a position of a torque actuator such as a throttle, camshaft, and/or spark timing. The method may judge if the RPM setpoint is met based on an output of the engine position sensor. If the RPM setpoint is not met, the method 300 may maintain launch control available at 316.

If the RPM setpoint is met, the method 300 judges if traction control is enabled "on" at 320. If traction control is enabled "on" at 320, the method 300 activates launch control at 324. In one example, initial launch may be determined from the vehicle speed being below a nominal non-zero threshold greater than a threshold amount, and the overriding provided in response thereto. In one example, the driver may release pressure from the clutch pedal to engage the clutch at a selected gear. During the initial launch, the method 300 overrides driver throttle commands to maintain the setpoint speed of the engine and limit wheel slip until wheel slip decreases below a non-zero threshold. In another example, wheel slip decreasing below the non-zero threshold may be determined responsive to the wheel speed sensor indicating driving and driven wheels within a margin of a threshold speed differential. In another example, the wheel slip decreasing below a non-zero threshold may be determined based on a threshold wheel slip ratio or wheel slip percentage. In one example, wheel slip may be limited by reducing power being sent to the wheels responsive to an indication of wheel slip above the non-zero threshold. In one example, the limiting wheel slip continues until a first to second gear transition and discontinues at the gear transition even if wheel slip remains above the non-zero threshold.

At 326, the method 300 determines whether speed of the vehicle, e.g., traveling speed, is greater than a threshold speed at 326. As one example, the threshold speed may be 5 mph. If vehicle speed is greater than a threshold speed, the method 300 may restore driver throttle control and return to maintain launch control available at 316.

If traction control is disabled 'off' at 322, the method activates launch control at 328. In one example, the driver may release pressure from the clutch pedal to engage the clutch at the selected gear. In one example, in response to initial launch being determined, the controller overrides driver throttle commands to maintain the setpoint speed of the engine until wheel speed exceeds a non-zero threshold. In one example, vehicle speed greater than a threshold speed may indicate wheel speed exceeding the non-zero threshold. In one example, the controller may maintain the setpoint speed until the vehicle speed exceeds the non-zero threshold.

At 330, the method 300 determines whether vehicle speed is greater than a threshold speed. If vehicle speed is greater than a threshold speed, the method 300 may restore driver throttle control and return to maintain launch control available at 316.

Referring now to FIG. 4A, the method 400 for a vehicle having a manual transmission is shown. Method 400 determines launch control "on" is requested at 402 or determines launch control "off" is requested at 404. If method 400 determines launch control "on" is requested the method continues to 406. Otherwise, the method returns.

At 406, method 400 determines traction control is enabled "on" or determines traction control is disabled 'off' at 408. If the method 400 determines traction control is enabled "on", the method continues to 410. Otherwise, the method directs to FIG. 4B.

Having determined that launch control is requested and traction control is enabled, the method 400 determines whether base conditions and engine-ready conditions for launch control are met. For example, at 410, the method 400 determines whether drive mode conditions are met. Drive mode conditions may include a plurality of selectable driving modes such as sport, normal, drag, wet, and so on, some of which may preclude the driver from using launch control. At 412, the method 400 determines whether engine preconditions are met. In some examples, engine preconditions may include engine temperature and/or engine pressure meeting respective thresholds, etc. In some examples, engine preconditions may include driveline control states. For example, launch control may unavailable with line lock selected (if available) and/or the transmission in reverse. At 414, the method 400 determines whether speed preconditions are met. Speed preconditions may include vehicle speed less than a threshold speed such as estimated from an output shaft speed sensor (e.g., output shaft speed sensor 235 in FIG. 2). If drive mode conditions, engine preconditions, and speed preconditions are met, the method 400 determines launch control is available at 418. Otherwise, the method 400 determines launch control is unavailable at 416.

Having determined that launch control is available, the method 400 judges whether conditions for activating launch control are met. In one example, the steps for activating launch control (e.g., 420, 422, and 424) may be considered staging steps for executing the initial launch maneuver. For example, at 420, the method 400 judges if the clutch pedal is fully pressed. In one example, the method 400 may judge if the clutch pedal is fully pressed based on an output of a clutch pedal position sensor. For example, the method may judge whether the clutch pedal position is exceeding a threshold position. At 422, the method 400 judges a status of the shifter, e.g., shifter not in reverse. In some examples, the status of the shifter may not be judged in the method. In another example, the status of the shifter may be judged as a precondition leading to launch control available at 418 or launch control unavailable at 416. If the status of the shifter is included, the method 400 may judge the status based on input from a gear position sensor, e.g., gear position sensors 275 in FIG. 2. At 424, the method 400 judges if the maximum driver demand pedal, or wide open pedal, with RPM setpoint is met. For example, the method 400 may judge if the wide open pedal condition is met based on an output of the driver pedal position sensor. The method 400 may judge if the RPM setpoint condition is met, e.g., RPM within a threshold of the setpoint speed, based on an output of the engine position sensor. In one example the setpoint speed may be a first setpoint speed. The engine RPM may be adjusted via adjusting a position of a torque actuator such as a throttle, camshaft, and/or spark timing.

If the clutch pedal position, shifter status (if included), driver demand pedal position, and RPM setpoint conditions are met, the method 400 activates launch control at 426. Otherwise, the conditions for activating launch control are not met and the method returns to 420. In one example, at 426, with launch control activated, the driver may transition to motion. In one example, the driver may side-step the clutch pedal to engage the clutch at the selected gear. In one example, in response to initial launch being determined, the controller overrides driver throttle commands to maintain the first setpoint speed of the engine and provides traction control assistance until wheel slip decreases below a first non-zero threshold. In one example, the clutch pedal rate of engagement is used to determine a timing of throttle opening. For example, faster clutch pedal rate of engagement may produce earlier throttle opening and slower clutch pedal rate of engagement may produce later throttle opening, such as shown in FIG. 5 below. Additionally or alternatively, the clutch pedal rate of engagement may be used to determine a rate of throttle opening. For example, a faster rate of engagement may increase a rate of throttle opening and a slower clutch pedal rate of engagement may decrease the rate of throttle opening. In one example, traction control assistance continues until a first to second gear transition and discontinues at the gear transition even if wheel slip remains above the first non-zero threshold. In one example, wheel slip decreasing below a threshold may be determined similarly as described with respect to FIG. 3.

At 428, the method 400 determines whether vehicle speed is greater than a threshold speed at 428. In one example, if vehicle speed is greater than a threshold speed, the method 400 restores driver throttle command, determines launch control is unavailable at 416 and returns.

Referring now to FIG. 4B, the method 450 for a vehicle having a manual transmission is shown. Method 450 is shown at 452 having determined launch control "on" is requested and traction control is disabled "off", e.g., at 406 and at 408 in FIG. 4A.

Having determined that launch control is requested and traction control is disabled, the method 450 determines whether base conditions and engine-ready conditions for launch control are met. For example, at 454, the method 450 determines whether drive mode conditions are met. Drive mode conditions may include a plurality of selectable driving modes such as sport, normal, drag, wet, and so on, some of which may preclude the driver from using launch control. At 456, the method 400 determines whether engine preconditions are met. In some examples, engine preconditions may include engine temperature and/or engine pressure meeting respective thresholds, and/or driveline control states, such as described with respect to method 400. At 458, the method 450 determines whether speed preconditions are met. Speed preconditions may include vehicle speed less than a threshold speed. If drive mode conditions, engine preconditions, and speed preconditions are met, the method 450 determines launch control is available at 462. Otherwise, the method 450 determines launch control is unavailable at 460.

Having determined that launch control is available, the method 450 judges whether conditions for activating launch control are met, such as described with respect to FIG. 4A. For example, at 464, the method 450 judges if the clutch pedal is fully pressed. At 466, optionally, the method 450 may judge a status of the shifter. In another example, the status of the shifter may be judged as a precondition leading to launch control available at 462 or launch control unavailable at 460. At 468, the method 450 judges if wide open pedal with RPM setpoint is met. For example, the method 450 may judge if the wide open pedal condition is met based on an output of the driver pedal position sensor. The method 400 may judge if the RPM setpoint condition is met, e.g., RPM within a threshold of the setpoint speed, based on an output of the engine position sensor. In one example the setpoint speed may be a second setpoint speed. In one example, the second setpoint speed may be the same as the first setpoint speed described in FIG. 4A. In other examples, the first setpoint speed and second setpoint speed may be different. In one example, the method 450 may judge if clutch pedal position, the driver demand pedal position, and the engine RPM based on respective thresholds.

If the clutch pedal position, shifter status (if included), driver demand pedal and engine RPM conditions are met, the method 450 activates launch control at 472. Otherwise, the conditions for activating launch control are not met and the method returns to 462. With launch control activated at 472, the driver may transition to motion. In other words, the driver may perform the initial launch maneuver assisted by launch control. For example, the driver may engage the clutch at the selected gear by releasing the clutch pedal. Similar to the example in FIG. 4A, the clutch pedal rate of engagement over time may be used to determine the timing of throttle opening and the rate of throttle opening. In response to an initial launch being determined, the controller may override driver throttle commands to maintain the second setpoint speed of the engine until wheel speed exceeds a second non-zero threshold. In one example, vehicle speed greater than a threshold speed may indicate wheel speed exceeding the second non-zero threshold. In one example, the controller may maintain the setpoint speed until the wheel speed exceeds the second non-zero threshold.

At 474, the method 400 determines whether vehicle speed is greater than a threshold speed at 474. In one example, if vehicle speed is greater than a threshold speed, the method 450 restores driver throttle command and returns to launch control unavailable at 460.

In one example, the methods for manual transmission launch control described herein may make decisions based on a state matrix. An example state matrix is illustrated in table 1 and includes an example key illustrated in table 2.

Table 1 illustrates conditions of the vehicle system that produce a transition from a first state to a second state. Example states in the table include: launch control off, launch control unavailable, launch control available, launch control active, and transition to motion. In one example, the transition to motion may be the driver performing an initial launch maneuver. In one example, the states in Table 1 may correspond to blocks in the method 300, the method 400, and the method 450. For example, launch control available at 316 in method 300, launch control available at 412 in method 400, and launch control available at 462 in the method 450 may be the same or similar as the available state in Table 1. Launch control active at 324 in method 300, launch control active at 426 in method 400, and launch control active at 472 in method 450 may be the same or similar as the active state in Table 1. In one example, the transition from available to active may include the conditions described in the matrix cell N described below in Table 2. The conditions may be the same or similar to the conditions described in method 300, method 400, and method 450. For example, when engine-ready conditions and base conditions are met, clutch not fully engaged, driver demand pedal pressed, and RPM is near HMI target speed. In one example, excluded state transitions include: unavailable to active, available to transition to motion, transition to motion to launch control off, transition to motion to unavailable, and transition to motion to active.

TABLE 1

| To From | Launch Control Off | Unavailable | Available | Active | Transition to Motion |
|---|---|---|---|---|---|
| Launch Control Off | A | F | K | P | U |
| Unavailable | B | G | L | Q | V |
| Available | C | H | M | R | W |
| Active | D | I | N | S | X |
| Transition to motion | E | J | O | T | Y |

Table 2 is an example key including descriptions of conditions of the vehicle system that produce the transitions in Table 1. In Table 2, launch control off LC_OFF, launch control unavailable is ON_UNAVAIL, launch control available is ON_AVAIL, launch control active is LC_ACTIVE, and transition to motion is EXIT. In Table 2, manual performance launch control is MT Perf LC.

TABLE 2

| Item | Description |
|---|---|
| A | Remain in LC_OFF until driver switches on MT Perf LC via HMI |
| B | LC_OFF→ON_UNAVAIL when driver switches on MT Perf LC, but if neither engine-ready and/or base conditions, e.g., drive mode, speed, not yet met |

TABLE 2-continued

| Item | Description |
|---|---|
| C | LC_OFF→ON_AVAIL when driver switches on MT Perf LC, and engine-ready and base conditions are ready for launch control |
| D | In non-State Machine construct LC_OFF →LC_ACTIVE is permitted when LC_ON is activated if conditions are met |
| E | Not a valid transition (EXIT state only accessible from ACTIVE state) |
| F | Go from ON_UNAVAIL→LC_OFF when driver switches MT Perf LC off via HMI |
| G | Remain in ON_UNAVAIL until engine-ready and base conditions met |
| H | Go from ON_UNAVAIL→ON_AVAIL when both engine-ready and base conditions are met |
| I | Allow immediate ON_UNAVAIL→LC_ACTIVE if vehicle is slowing down, customer is 100% clutch disengaged, driver demand pedal at WOP |
| J | Not a valid transition (EXIT state only accessible from ACTIVE state) |
| K | Go from ON_AVAIL→LC_OFF when driver switches MT Perf LC off via HMI |
| L | Go from ON_AVAIL→ON_UNAVAIL when engine-ready conditions or base conditions not met |
| M | Remain in ON_AVAIL |
| N | Go from ON_AVAIL→ACTIVE when engine-ready conditions and base conditions are met, clutch not fully engaged, driver demand pedal pressed, and RPM is near HMI target speed |
| O | Not a valid transition (EXIT state only accessible from ACTIVE state) |
| P | Permit transition to LC_ACTIVE→LC_OFF |
| Q | Not a valid transition (EXIT state only accessible from ACTIVE state) |
| R | LC_Active→LC_ON_AVAIL is expected during aborted launch actions, where engine-ready conditions are ok, base conditions still met but driver demand != LC (e.g., driver backs out of depressing driver demand pedal during staging) Permit this transition (in lieu of forcing LC_EXIT) since it will involve pedal back out-at low demand LC_EXIT actions should not be required |
| S | Remain in LC_ACTIVE as long as all required action are met. This state typically precedes an actual launch. |
| T | Go from LC_ACTIVE→LC_EXIT when system detects a true launch has occurred, of if loss of a condition that warrants a 'managed exit' (e.g., ramp out of target speed, and/or time based criteria), or if driver commands LC_OFF while active and in motion Provide option for 'normal' exit vs alternate (softer) exit for special conditions (e.g., HW degraded while active) This transition is required for escape from LC_ACTIVE when driver demand is high Upon further consideration, loss of any precondition can be routed through LC_EXIT-this simplifies the transition matrix by eliminating the need for Q |
| U | Go from LC_EXIT to LC_OFF when the driver switches from MT Perf LC off via HMI Provide this path as a means of getting from T to LC_OFF |
| V | LC_EXIT→ON_UNAVAIL represents the completion of a true launch or managed exit due to some engine-ready or base conditions not being met. |
| W | Not a valid transition (EXIT state only accessible from ACTIVE state) |
| X | This can happen if exit is in progress and inhibit condition is cleared |
| Y | Remain in EXIT state until ramp out of action is completed |

In one example, the state transition from launch control available to launch control active as described in Table 1 and Table 2, may be the same or similar as the transition from 418 to 426 in the method 400. For example, the transition from available to active may include the conditions described in the matrix cell N in Table 1 and described in Table 2, including engine-ready conditions and base conditions being met, clutch not fully engaged, driver demand pedal pressed, and RPM is near the setpoint speed of the engine.

In one example, the methods for manual transmission launch control described herein may provide visual indications to the driver. For example, the indication may be a visual indication that is presented via the human/machine interface. In one example, a first set of icons may be presented for launch control requested with traction control enabled. For example, an icon may be presented indicating launch control available, e.g., 418 in FIG. 4. A different icon may be presented indicated launch control unavailable, e.g., 416 in FIG. 4A. A yet different icon may be presented indicating launch control active, e.g., 426 in FIG. 4A. In another example, a second set of icons for indicating launch control available, unavailable, and active, the second set different from the first set, may be presented for launch control requested with traction control disabled.

FIG. 5 shows an example plot 500 illustrating a relationship between launch control staging and clutch pedal engagement. The vertical axis represents clutch pedal engagement, which is given as a percent of full engagement. The horizontal axis represents clutch pedal position rate of change and rate decreases from the left side of the figure to the right side of the figure. Trace 502 shows clutch pedal rate of change decreasing from left to right. For example, a very negative value (e.g., −1000) means the clutch pedal is moving from an engaged to disengaged state very quickly. For another example, a less negative value (e.g., −150) means the clutch pedal is moving from an engaged to a disengaged state less quickly.

In one example, the method may transition from launch control active to transition to motion, e.g., T in table 1, in response to indication of true launch. In one example, the transition from launch control activation to transition to motion is dependent on a rate of release of the clutch pedal. The method may include controlling a timing of throttle opening based on the rate of clutch pedal engagement. For example, a faster clutch pedal rate of change (e.g., more negative %/s) will open throttle earlier, e.g., sooner, thus generating more torque. A slower clutch pedal rate (e.g., less negative %/s) will open throttle later and protects the clutch from 'slow releases' and decreases engine inertia. As another example, the method may include controlling a rate of throttle opening based on the rate of clutch pedal engagement. For example, the rate of throttle opening may be increased for faster clutch pedal rates of change.

FIG. 6, FIG. 7, and FIG. 8 show an example use series of the systems and methods for assisting a driver to perform an initial launch maneuver for a vehicle having a manual transmission, such as described with respect to FIG. 3, FIG. 4A, FIG. 4B, Table 1 and Table 2, and FIG. 5. FIG. 6, FIG. 7 and FIG. 8 illustrate a dashboard 602, an HMI 604, a clutch pedal 606, a brake pedal 608, a driver demand pedal 610, and a shifter 612. In the example series a driver may interact with the HMI 604, the driver has a left foot 614 and a right foot 616 that may interact with the clutch pedal 606, the brake pedal 608, and the driver demand pedal 610, and the driver may select a position of the shifter 612.

Turning now to FIG. 6, at time 600 the engine is on and the engine speed 624 of the dashboard 602 is near 1000 RPM. The vehicle speed 626 is zero. The driver has selected options from the HMI 604 including a drive mode 628 set to normal and traction control 630 set to disabled. The driver requested launch control. In one example, immediately prior to time 600, the driver interacted with the HMI 604 to select from available applications a Launch Control application. Inside the Launch Control application, the HMI 604 shows launch settings including launch control button 618 set to enable. The RPM selector 620 is set to an engine speed setpoint of 7000 RPM. The setpoint speed of the engine, e.g., the chosen RPM, is shown in region 622.

The left foot 614 and right foot 616 of the driver are not interacting with the pedals such that clutch pedal 606 pressure is 0%, brake pedal pressure is 0%, and driver demand pedal pressure is 0%. The shifter 612 is in neutral. The dashboard 602 in region 632 indicates the setpoint speed for launch control is 7000 RPM. Also in region 632, an icon 634 indicates a status of launch control (e.g., available, unavailable, active) and a status of traction control (e.g., enabled, disabled). An icon 638 near engine speed 624 is shown indicating the same status information as the icon 634. At time 600, icons 634, 638 indicate traction control is disabled and launch control is unavailable. Launch control is unavailable due to one or more engine preconditions not yet being met, such as the engine temperature 636 being lower than a threshold temperature.

Turning now to FIG. 7, at time 700 the engine temperature 636 is warmer, the engine speed 624 is near 1000 RPM, the vehicle speed 626 is zero, the drive mode 628 is normal, the shifter 612 is set to neutral, and traction control 630 is set to disabled. Region 632 shows launch control is requested with the setpoint speed at 7000 RPM. In one example, immediately prior to time 600, the driver applied pressure to the driver demand pedal 610 sending a signal to the driveline controller to increase throttle and warm the engine. Thus, the engine preconditions, drive mode preconditions, and speed preconditions are met and launch control is available at time 700. Icons 634, 638 indicate launch control is available and the traction control is disabled.

With launch control available, the left foot 614 fully depresses the clutch pedal 606. The clutch pedal 606 pressure is 100% and the clutch is disengaged.

Turning now to FIG. 8, at time 800 the left foot 614 continues to fully depress the clutch pedal 606. At the same time, the right foot 616 fully depresses the driver demand pedal 610. The clutch pedal 606 pressure is 100% and the driver demand pedal 610 pressure is 100%. Responsive to the driver demand pedal commands, e.g., clutch pedal fully pressed, driver demand pedal indicating WOP, the driveline controller maintains the engine speed 624 at the setpoint, e.g., 7000 RPM. Thus, engine-ready conditions and base conditions are met, the clutch is not fully engaged, the driver demand pedal is pressed, and the RPM is within a threshold of the setpoint. Thus, launch control is active at time 800. The HMI indicates via icons 634, 638 the launch control status is active and the traction control status is disabled.

In response to active launch control, the driver may execute an aggressive launch maneuver, e.g., transition to motion, such as by selecting a gear and rapidly releasing the clutch pedal to engage the gear quickly while the powertrain controller maintains the engine speed setpoint. In one example, the powertrain controller may override driver throttle commands to maintain the setpoint speed until the vehicle speed exceeds 5 mph. The example series illustrated in FIG. 6, FIG. 7, and FIG. 8 show a case use where traction control is disabled. A similar series of actions may be performed with traction control enabled.

FIG. 9 illustrates an example boundary diagram 900 illustrating components of the manual transmission launch control system. As one example, a driver may interface with controls included in the boundary diagram 900 to request assistance for performing an initial launch maneuver, or in other words, to request launch control. The boundary diagram 900 includes hardwired communication indicated by solid lines and networked communication indicated by dashed lines. In one example, the boundary diagram 900 includes a powertrain controller 902, an integrated control panel 904, and a steering column controller 906. Components included in the boundary diagram 900 may receive input from a driver 908, Service/FCSD 916, Vehicle Operations and End of Line 918, and External Factors/Noise Factors 960. External Factors/Noise Factors 960 may include environment factors, road conditions, time conditions, final drive spec, and gloves for capacitance. The driver 908 may interact with a driver guide 910.

The driver 908 may interact with components contained in the boundary diagram 900. For example, the driver 908 may interact with a launch control menu or LC Menu 946 by accessing a track applications 944 feature after selecting SYNC HMI 942. The driver 908 may interact with an ON/OFF 948 feature of the LC menu 946, an RPM setting 950 feature of the LC menu 946, and an APIM (SYNC) 952 feature. As one example, LC menu 946 may include options 940 such as disable LC, Set LC, and Set RPM for requesting and setting up launch control. The APIM (SYNC) 952 feature may be in networked communication with the integrated control panel 904, an ECG/GWM 912, and the integrated control panel cluster or IPC cluster 954. The IPC cluster 954 may provide inputs to the driver 908 via Display Status in Cluster 956. In one example, the APIM (SYNC) performs launch control inputs. A launch control state, such as launch control available, unavailable, and active, may be provided to the driver 908 via the IPC Cluster 954, including a status of the RPM setpoint/Status 958.

The driver 908 may interact with one or more of a feature setting 938, traction control switch 936, and favorites setting 934, each of which may be in hardwired communication with the integrated control panel 904. In one example, favorites setting 934 may be set to enable/disable launch control and/or track applications 944. In one example, the customer may request enabling traction control via the traction control switch 936. The driver 908 may interact with a drive mode 932 feature that may be in hardwired communication with the steering column controller 906. In one example, the driver 908 may select a drive mode such as sport, normal, drag, track, custom, wet, and so on, and the selected mode may be provided to the steering column controller 906. In some examples, selecting certain drive modes may prevent launch control from being available to the driver.

The driver 908 may interact with a clutch pedal 930 (e.g., via an MC sensor or a BOT switch), a driver demand pedal 928, and a shifter 926. The clutch pedal 930, the driver demand pedal 928, and the shifter 926 may be in hardwired communication with the powertrain controller 902. In one example, inputs from the driver 908 to the powertrain controller 902 via the clutch pedal 930, the driver demand pedal 928, and the shifter 926, may be judged for determining whether launch control may be activated.

In one example, the boundary diagram 900 includes the steering column controller 906 and the powertrain controller 902 in networked communication with the ECG/GWM 912. For example, driver requests provided to the integrated control panel 904, such as to enable traction control, and sensor signals received by the powertrain controller 902, such as pedal position, may be communicated to the ECG/GWM 912. In one example, the powertrain controller 902 is in networked communication with the ABS 914 and in hardwired communication with the powertrain components 920 including engine (e.g., engine 10), the transmission (e.g., manual transmission 208), and front and rear differentials (e.g., differential 219). The powertrain controller 902 may receive via the ECG/GWM 912 and other networked components the setpoint speed, traction control status, drive mode, vehicle speed, and various other engine preconditions and base conditions for activating launch control. The powertrain controller 902 may control torque to wheels 922 via hardwired communication with the powertrain components 920. Torque to wheels 922 may also be controlled by the powertrain controller 902 via the ABS 914. For example, the ABS 914 may control foundation brakes 924 in hardwired communication with torque to wheels 922.

Figure 10:
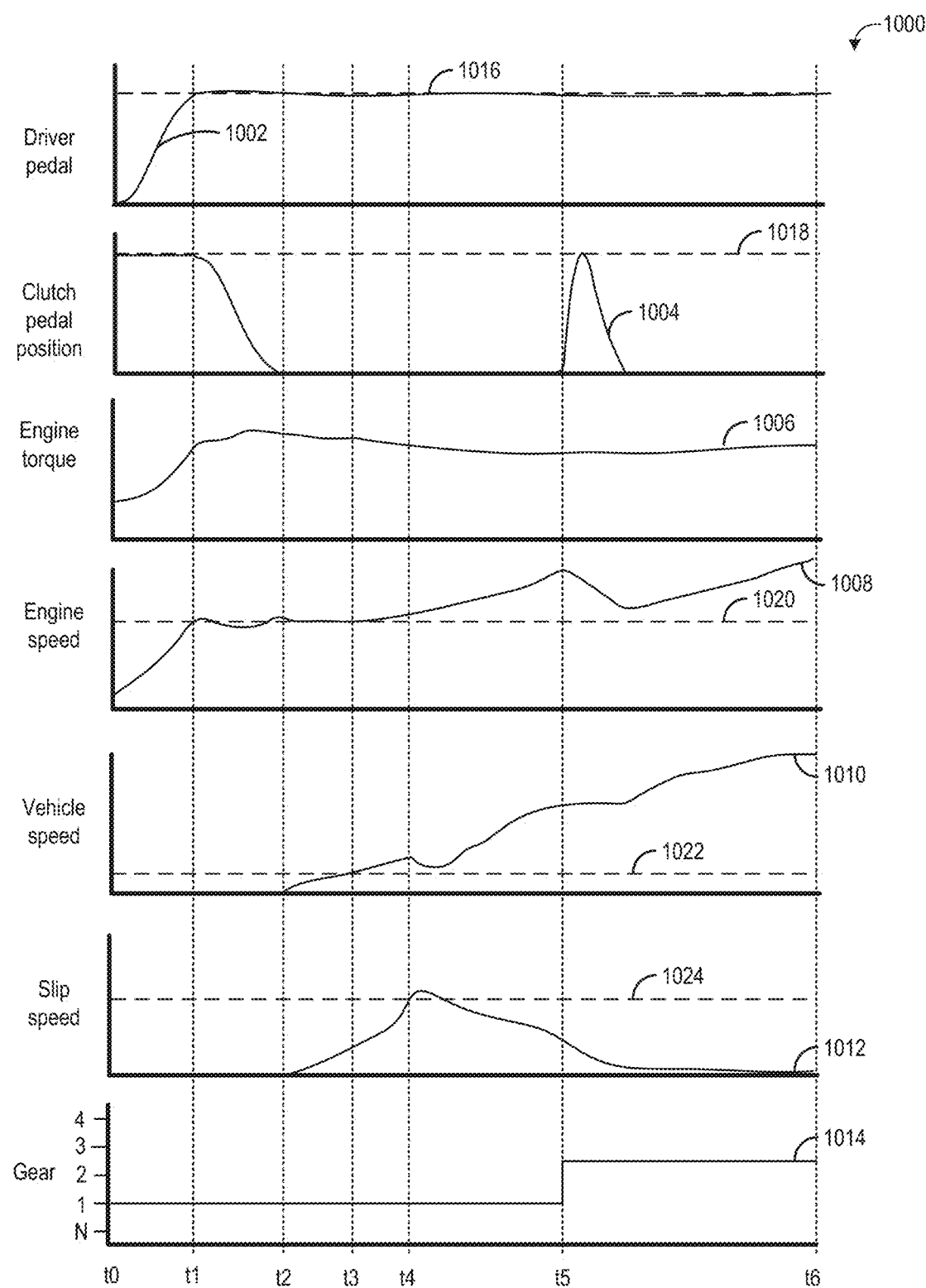
FIG. 10 shows a timing diagram for a first example prophetic operation of a method for assisting a driver during launch for a manual transmission.
Figure 11:
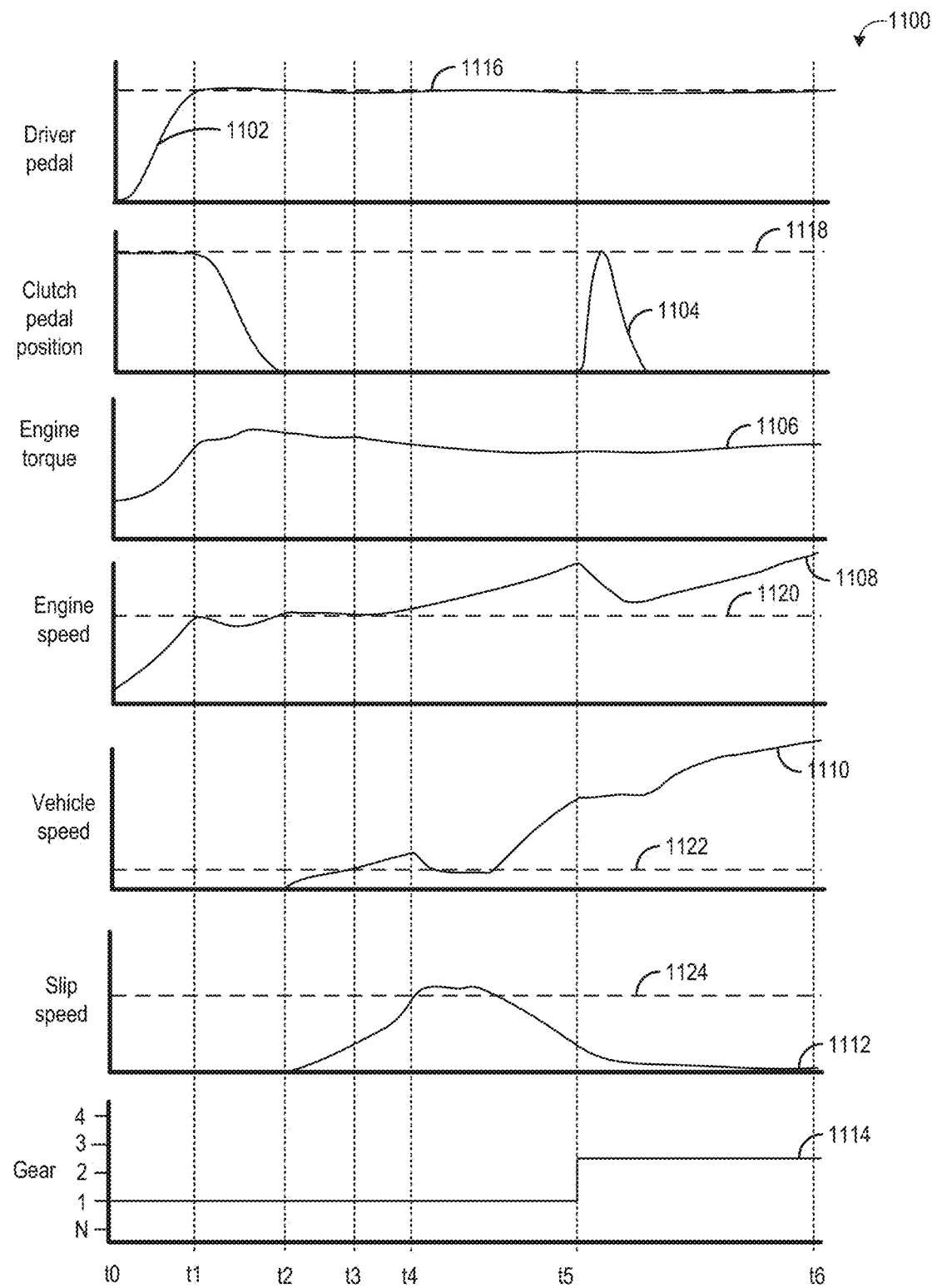
FIG. 11 shows a timing diagram for a second example prophetic operation of a method for assisting a driver during launch for a manual transmission.

FIG. 10 and FIG. 11 show timing diagrams illustrating example prophetic operation of methods for assisting a driver to perform an initial launch in a vehicle system having a manual transmission and clutch pedal. In one example, FIG. 10 shows a timing diagram 1000 for an example according to the method 300 of FIG. 3 and the method 400 of FIG. 4A. In one example, FIG. 11 shows a timing diagram 1100 for an example according to the method 300 of FIG. 3 and the method 450 of FIG. 4B. The timing diagram 1000 and timing diagram 1100 illustrate overriding driver throttle commands to maintain a setpoint speed of the engine, the overriding activated based on indications from the driver and the vehicle system. Timing diagram 1000 further illustrates traction control operation responsive to indications of greater than threshold wheel slip. The horizontal (x-axis) denotes time and the vertical markers t0-t6 identify relevant times in the methods of FIG. 3, FIG. 4A, and FIG. 4B.

As elaborated in timing diagram 1000, a driver pedal position is indicated at plot 1002. In the example, the driver pedal position is determined based on a signal received from a pedal position sensor, such as driver pedal position sensor 134 of FIG. 1. A clutch pedal position is indicated at plot 1004. In the example, the clutch pedal position is determined based on a signal received from a clutch pedal sensor, such as clutch pedal sensor 232 of FIG. 2. Engine torque is indicated in plot 1006. In the example, the controller adjusts throttle to maintain an engine speed setpoint responsive to sensor signals from the engine system. Engine speed is indicated in plot 1008 and is determined based on sensor signals from an engine position sensor, such as the engine position sensor 118 in FIG. 1. At graph 1010, a vehicle speed is indicated by a vehicle speed sensor, such as the output shaft speed sensor sensor of 235 of FIG. 2. At graph 1012, a wheel slip speed is indicated by one or more wheel speed sensors, such as wheel speed sensors 221. Gear position is indicated at plot 1014. Gear position is measured by a gear position sensor, such as gear position sensor 275 in FIG. 2. Thresholds are given as follows. A threshold driver demand 1016 is set for the driver pedal position indicating wide open pedal. A threshold clutch position 1018 is set for the clutch pedal position indicating clutch pedal fully pressed. The setpoint speed 1020 indicates the driver-selected RPM for initial launch. A threshold vehicle speed 1022 is given. A threshold slip speed 1024 is given. The plots 1002, 1004, 1006, 1008, 1010, and 1012 show an increase upwards along the y-axis.

Prior to t0, the engine is powered on and warming. The driver selected sport drive mode, turned on launch control, and enabled traction control. The driver chose a setpoint engine speed of 2500 RPM. The drive mode conditions, engine preconditions, and speed preconditions are met, and launch control is available. At t0, the driver pedal is not depressed and the clutch pedal is fully pressed. The driver selects first gear. From period t0 to t1, the driver requests increasing torque while holding the clutch pedal fully pressed. The engine speed increases towards the setpoint speed 1020.

At t1, the driver requests wide open pedal. Based on the indication from the wide open pedal, the clutch pedal fully depressed, the engine speed within a threshold of the setpoint speed, and the shifter in first gear, launch control is activated.

From t1 to t2, with launch control activated, the driver releases pressure from the clutch pedal indicating the initial launch maneuver, or in other words, the transition to motion. The driver continues to fully depress the driver pedal while the controller overrides the demand signal to maintain the setpoint speed at 2500 rpm. The controller maintains the setpoint speed by adjusting engine torque responsive to signals from the engine position sensor and based on the rate of clutch release. The engine speed dips below the setpoint briefly. In response, the throttle opening is increased to increase engine torque.

At t2, the clutch is fully released. From t2 to t3, the engine speed is maintained at the setpoint speed by the controller. The vehicle speed and wheel slip speed increase.

At t3, the vehicle speed increases above the threshold speed, e.g., 5 mph. Driver pedal command is enabled. The traction control system monitors wheel slip. The driver pedal command remains wide open pedal. From t3 to t4, wheel slip increases.

At t4, wheel slip exceeds the threshold wheel slip. In response to wheel slip exceeding the threshold wheel slip, from t4 to t5 the traction control system reduces power to the vehicle wheels via brake intervention. The vehicle speed reduces briefly and the wheel traction increases. As time approaches t5, by temporarily reducing power to the wheels, the wheels regain traction quickly and vehicle speed increases. Engine speed increases in response to continued driver pedal request for wide open pedal.

At t5, the driver depresses the clutch and shifts into second gear. From t5 to t6, the driver releases the clutch and the vehicle speed increase. At t6, the initial launch maneuver is complete.

As elaborated in timing diagram 1100, a driver pedal position is indicated at plot 1102. In the example, the driver pedal position is determined based on a signal received from a pedal position sensor, such as driver pedal position sensor 134 of FIG. 1. A clutch pedal position is indicated at plot 1104. In the example, the clutch pedal position is determined based on a signal received from a clutch pedal position sensor, such as clutch pedal sensor 232 of FIG. 2. Engine torque is indicated in plot 1106. In the example, the controller adjusts throttle to maintain an engine speed setpoint responsive to sensor signals from the engine system. Engine speed is indicated in plot 1108 and is determined based on sensor signals from an engine position sensor, such as the engine position sensor 118 in FIG. 1. At plot 1110, a vehicle speed is indicated by a vehicle speed sensor, such as the output shaft speed sensor of 235 of FIG. 2. At plot 1112, a wheel slip speed is indicated by a one or more wheel speed sensors, such as wheel speed sensors 221. Gear position is indicated at plot 1114. Gear position is measured by a gear position sensor, such as gear position sensor 275 in FIG. 2. Thresholds are given as follows. A threshold driver demand 1116 is set for the driver pedal position indicating wide open pedal. A threshold clutch position 1118 is set for the clutch pedal position indicating clutch pedal fully pressed. The setpoint speed 1120 indicates the driver-selected RPM for initial launch. A threshold vehicle speed 1122 is given. A threshold slip speed 1124 is given. The plots 1102, 1104, 1106, 1108, 1110, and 1112 show an increase upwards along the y-axis.

Prior to t0, the engine is powered on and warming. The driver selected sport drive mode, turned on launch control, and disabled traction control. The driver chose a setpoint engine speed of 2500 RPM. The drive mode conditions, engine preconditions, and speed preconditions are met, and launch control is available. At t0, the driver pedal is not depressed and the clutch pedal is fully pressed. The driver selects first gear. From period t0 to t1, the driver requests increasing torque while holding the clutch pedal fully pressed. The engine speed increases towards the setpoint speed 1120.

At t1, the driver requests wide open pedal. Based on the indication from the wide open pedal, the clutch pedal fully depressed, the engine speed within a threshold of the setpoint speed, and the shifter in first gear, launch control is activated.

From t1 to t2, with launch control activated, the driver releases pressure from the clutch pedal indicating the initial launch maneuver, or in other words, the transition to motion. The driver continues to fully depress the driver pedal while the controller overrides the demand signal to maintain the setpoint speed of 2500 rpm. The controller maintains the setpoint speed by adjusting engine torque responsive to signals from the engine position sensor and based on the rate of clutch release. The engine speed dips below the setpoint briefly. In response, the throttle opening is increased.

At t2, the clutch is fully released. From t2 to t3, the engine speed is maintained at the setpoint speed by the controller. The vehicle speed and wheel slip speed increase.

At t3, the vehicle speed increases above the threshold speed, e.g., 5 mph. Driver pedal command is enabled. The driver pedal command remains wide open pedal. From t3 to t4, wheel slip increases.

At t4, wheel slip exceeds the threshold wheel slip. The driver continues to demand maximum pedal. With traction control disabled, from t4 to t5, the vehicle speed reduces with the loss of traction, and after a time, the wheels catch and vehicle speed again increases. As time approaches t5, engine speed increases in response to continued driver pedal requesting wide open pedal.

At t5, the driver depresses the clutch and shifts into second gear. From t5 to t6, the driver releases the clutch and the vehicle speed increases. At t6 the initial launch maneuver is complete.

In this way, by overriding driver throttle commands to maintain a setpoint engine speed and limiting wheel slip until wheel slip decreases below a threshold, the driver may perform more controlled initial launch maneuvers. The assistance allows the driver to focus on efficiently engaging the clutch while traction control may apply brake intervention as needed to limit wheel slip. Moreover, the systems and methods described herein provide flexible control by assisting the driver to maintain the setpoint engine speed with traction control disabled. In some examples, increasing control during initial launch maneuvers may reduce wear on the powertrain that may otherwise occur due to novice handling. The technical effect is increased driver enjoyment and reduced wear on the vehicle system.

The disclosure also provides support for a method for operating a vehicle having a manual transmission and a clutch pedal, comprising: during an initial launch with traction control enabled, overriding driver throttle commands to maintain a setpoint speed of an engine and limiting wheel slip until wheel slip decreases below a non-zero threshold. In a first example of the method, the initial launch is determined from vehicle speed being below a nominal non-zero threshold greater than a threshold amount, wherein the overriding is enabled responsive to the initial launch being determined. In a second example of the method, optionally including the first example, the overriding is activated responsive to a clutch pedal position and a clutch pedal rate of engagement over time. In a third example of the method, optionally including one or both of the first and second examples, a driver inputs the setpoint speed via a machine/human interface. In a fourth example of the method, optionally including one or more or each of the first through third examples, the limiting wheel slip includes reducing power being sent to wheels of the vehicle responsive to an indication of wheel slip above the non-zero threshold. In a fifth example of the method, optionally including one or more or each of the first through fourth examples, the overriding is activated responsive to an indication of a clutch pedal position exceeding a threshold and a wide open pedal. In a sixth example of the method, optionally including one or more or each of the first through fifth examples, the overriding is activated responsive to an indication of engine speed within a threshold of the setpoint speed. In a seventh example of the method, optionally including one or more or each of the first through sixth examples, the limiting wheel slip continues until a first to second gear transition and discontinues at the gear transition even if wheel slip remains above the non-zero threshold. In an eighth example of the method, optionally including one or more or each of the first through seventh examples, the overriding is enabled responsive to an indication of one or more engine-ready conditions and one or more base conditions.

The disclosure also provides support for a method for operating a vehicle having a manual transmission and a clutch pedal, comprising: during an initial launch with traction control disabled, overriding driver throttle commands to maintain a setpoint speed of an engine until wheel speed exceeds a non-zero threshold. In a first example of the method, the initial launch is determined from vehicle speed being below a nominal non-zero threshold greater than a threshold amount, wherein the overriding is enabled responsive to the initial launch being determined. In a second example of the method, optionally including the first example, a driver inputs the setpoint speed via a machine/human interface. In a third example of the method, optionally including one or both of the first and second examples, the overriding is enabled responsive to an indication of one or more engine-ready conditions and one or more base conditions. In a fourth example of the method, optionally including one or more or each of the first through third examples, the overriding is activated responsive to an indication of a clutch pedal position exceeding a threshold and a wide open pedal.

The disclosure also provides support for a vehicle system, comprising: an engine, a manual transmission coupled to the engine, a plurality of wheels coupled to the manual transmission, a clutch pedal, and a controller including executable instructions stored in non-transitory memory to, during an initial launch with traction control enabled, override driver throttle commands to maintain a first setpoint speed of the engine and limit wheel slip until wheel slip decreases below a first non-zero threshold, and during the initial launch with traction control disabled, override driver throttle commands to maintain a second setpoint speed of the engine until wheel speed exceeds a second non-zero threshold. In a first example of the system, the system further comprises: instructions to control a timing of throttle opening based on a clutch pedal rate. In a second example of the system, optionally including the first example, a faster rate of clutch pedal engagement produces an earlier throttle opening and a slower rate of clutch pedal engagement produces a later throttle opening. In a third example of the system, optionally including one or both of the first and second examples, the system further comprises: a first throttle and second throttle. In a fourth example of the system, optionally including one or more or each of the first through third examples, the system further comprises: a machine/human interface. In a fifth example of the system, optionally including one or more or each of the first through fourth examples, the system further comprises: instructions to enable the override responsive to an indication of meeting one or more engine-ready conditions, one or more speed preconditions, and one or more drive mode conditions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle having a manual transmission and a clutch pedal, comprising:
during an initial launch with traction control enabled, overriding driver throttle commands to maintain a setpoint speed of an engine and limiting wheel slip until wheel slip decreases below a non-zero threshold; and controlling a timing of throttle opening based on a clutch pedal rate of engagement.

2. The method of claim 1, wherein the initial launch is determined from vehicle speed being below a nominal non-zero threshold greater than a threshold amount, wherein the overriding is enabled responsive to the initial launch being determined.

3. The method of claim 1, wherein the overriding is activated responsive to a clutch pedal position and the clutch pedal rate of engagement over time.

4. The method of claim 1, wherein a driver inputs the setpoint speed via a machine/human interface.

5. The method of claim 1, wherein the limiting wheel slip includes reducing power being sent to wheels of the vehicle responsive to an indication of wheel slip above the non-zero threshold.

6. The method of claim 1, wherein the overriding is activated responsive to an indication of a clutch pedal position exceeding a threshold and a wide open pedal.

7. The method of claim 1, wherein the overriding is activated responsive to an indication of engine speed within a threshold of the setpoint speed.

8. The method of claim 1, wherein the limiting wheel slip continues until a first to second gear transition and discontinues at the gear transition even if wheel slip remains above the non-zero threshold.

9. The method of claim 1, wherein the overriding is enabled responsive to an indication of one or more engine-ready conditions and one or more base conditions.

10. A method for operating a vehicle having a manual transmission and a clutch pedal, comprising:
during an initial launch with traction control disabled, overriding driver throttle commands to maintain a setpoint speed of an engine until wheel speed exceeds a non-zero threshold, and controlling a timing of throttle opening based on a clutch pedal rate.

11. The method of claim 10, wherein the initial launch is determined from vehicle speed being below a nominal non-zero threshold greater than a threshold amount, wherein the overriding is enabled responsive to the initial launch being determined.

12. The method of claim 10, wherein a driver inputs the setpoint speed via a machine/human interface.

13. The method of claim 10, wherein the overriding is enabled responsive to an indication of one or more engine-ready conditions and one or more base conditions.

14. The method of claim 10, wherein the overriding is activated responsive to an indication of a clutch pedal position exceeding a threshold and a wide open pedal.

15. A vehicle system, comprising:
an engine;
a manual transmission coupled to the engine;
a plurality of wheels coupled to the manual transmission;
a clutch pedal; and
a controller including executable instructions stored in non-transitory memory to,
during an initial launch with traction control enabled, override driver throttle commands to maintain a first setpoint speed of the engine and limit wheel slip until wheel slip decreases below a first non-zero threshold;
during the initial launch with traction control disabled, override driver throttle commands to maintain a second setpoint speed of the engine until wheel speed exceeds a second non-zero threshold; and
control a timing of throttle opening based on a clutch pedal rate.

16. The vehicle system of claim 15, wherein a faster rate of clutch pedal engagement produces an earlier throttle opening and a slower rate of clutch pedal engagement produces a later throttle opening.

17. The vehicle system of claim 15, further comprising a first throttle and second throttle.

18. The vehicle system of claim 15, further comprising a machine/human interface.

19. The vehicle system of claim 18, further comprising instructions to enable the override responsive to an indication of meeting one or more engine-ready conditions, one or more speed preconditions, and one or more drive mode conditions.

* * * * *